United States Patent
Tek et al.

(10) Patent No.: US 7,773,787 B2
(45) Date of Patent: Aug. 10, 2010

(54) METHOD AND APPARATUS FOR DETECTING BLOOD VESSEL BOUNDARIES USING MULTI-SCALE MEAN-SHIFT RAY PROPAGATION

(75) Inventors: Huseyin Tek, Princeton, NJ (US); Alper Ayvaci, Istanbul (TR); Dorin Comaniciu, Princeton Junction, NJ (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 968 days.

(21) Appl. No.: 11/399,164

(22) Filed: Apr. 6, 2006

(65) Prior Publication Data
US 2006/0262988 A1 Nov. 23, 2006

Related U.S. Application Data

(60) Provisional application No. 60/672,634, filed on Apr. 19, 2005.

(51) Int. Cl.
*G06K 9/00* (2006.01)
*G06K 9/34* (2006.01)

(52) U.S. Cl. .......................... 382/128; 382/154; 382/173; 382/199

(58) Field of Classification Search .................. 382/128, 382/130, 115, 117, 173, 190, 195
See application file for complete search history.

(56) References Cited

U.S. PATENT DOCUMENTS

| | | | | |
|---|---|---|---|---|
| 6,047,090 A * | 4/2000 | Makram-Ebeid | ............. | 382/257 |
| 6,385,332 B1 * | 5/2002 | Zahalka et al. | .............. | 382/128 |
| 6,590,999 B1 * | 7/2003 | Comaniciu et al. | .......... | 382/103 |
| 6,658,143 B2 * | 12/2003 | Hansen et al. | .............. | 382/133 |
| 6,785,409 B1 * | 8/2004 | Suri | ........................... | 382/128 |
| 6,947,040 B2 | 9/2005 | Tek et al. | | |
| 7,015,907 B2 | 3/2006 | Tek et al. | | |
| 2003/0095121 A1 | 5/2003 | Huseyin et al. | | |
| 2004/0171932 A1 * | 9/2004 | Raman et al. | ............... | 600/425 |

FOREIGN PATENT DOCUMENTS

DE 10249320 A1 5/2003

OTHER PUBLICATIONS

Tek et al. (Dec. 2001) "Vessel detection by mean shift based ray propagation." Proc. IEEE Workshop on Mathematical Methods in Biomedical Image Analysis, pp. 228-235.*

Tek et al. (Oct. 2005) "Multi-scale vessel boundary detection." Proc. 1$^{st}$ Int'l Workshop on Computer Vision for Biomedical Image Applications, pp. 388-398.*

(Continued)

*Primary Examiner*—Brian P Werner
*Assistant Examiner*—Barry Drennan (57) ABSTRACT

Disclosed is a method and system for detecting a boundary of a vessel in an image. Edges in the image are detected. Edge detection is based on the change in intensity over some distance while varying the scale of the distance. A set of edges is then selected from the detected edges. An initial vessel boundary is determined based on the selected set, and a shape descriptor (e.g., one or more elliptical shape descriptors) is applied to the initial vessel boundary to determine a final vessel boundary.

24 Claims, 9 Drawing Sheets

OTHER PUBLICATIONS

Rosenfeld et al. (May 1971) "Edge and curve detection for visual scene analysis." IEEE Trans. on Computers, vol. C-20 Issue 5, pp. 562-569.*

Xu et al. (Oct. 2001) "Atherosclerotic plaque segmentation at human carotid artery based on multiple contrast weighting MR images." Proc. 2001 Int'l Conf. on Image Processing, vol. 2 pp. 849-852.*

Setarehdan et al. (Nov. 1999) "Automatic cardiac LV boundary detection and tracking Using hybrid fuzzy temporal and fuzzy multiscale edge detection." IEEE Trans. on Biomedical Engineering, vol. 46 No. 11, pp. 1364-1378.*

Elder et al., "Contour Grouping With Prior Models", IEEE Transactions on Pattern Analysis and Machine Intelligence, vol. 25, Issue 6, Jun. 2003, pp. 661-674.

* cited by examiner

METHOD AND APPARATUS FOR DETECTING BLOOD VESSEL BOUNDARIES USING MULTI-SCALE MEAN-SHIFT RAY PROPAGATION

This application claims the benefit of U.S. Provisional Application No. 60/672,634 filed Apr. 19, 2005, which is incorporated herein by reference.

BACKGROUND OF THE INVENTION

The present invention relates generally to medical diagnostics, and more particularly to the determination of vessel boundaries in a medical image.

To diagnose a problem of a patient, medical professionals often have to examine the patient's vessels (e.g., blood vessels). To illuminate a vessel so that the medical professional can examine the vessel, a patient consumes (e.g., drinks) a contrast-enhancing agent. The contrast-enhancing agent brightens one or more vessels relative to the surrounding area.

The main goal of the majority of contrast-enhanced (CE) magnetic resonance angiography (MRA) and computed tomography angiography (CTA) is diagnosis and qualitative or quantitative assessment of pathology in the circulatory system. Once the location of the pathology is determined, quantitative measurements can be made on the original 2 dimensional slice data or, more commonly, on 2 dimensional multi planar reformat (MPR) images produced at user-selected positions and orientations. In the quantification of stenosis, it is often desirable to produce a cross-sectional area/radius profile of a vessel so that one can compare pathological regions to healthy regions of the same vessel.

Accurate and robust detection of vessel boundaries is traditionally a challenging task. In particular, a vessel boundary detection algorithm has to be accurate and robust so that the algorithm can be used to accurately detect vessel boundaries on many types of medical images. If the vessel boundary detection algorithm is inaccurate (even in a small number of cases), a medical professional (e.g., a radiologist) relying on the computer's output may, in turn, incorrectly diagnose the patient.

There are many reasons why accurate and robust detection of vessel boundaries is a challenging task. First, the presence of significant noise levels in computed tomography (CT) and magnetic resonance (MR) images often forms strong edges (i.e., changes in intensity between data points) inside vessels. Second, the size of a vessel can vary from one vessel location to another, resulting in additional edges. Third, the intensity profile of a vessel boundary can be diffused at one side while shallow on the other sides (e.g., due to the presence of other vessels or high contrast structures). Fourth, the presence of vascular pathologies, e.g., calcified plaques, often makes the shape of a vessel cross-sectional boundary locally deviate from a circular shape. These all result in additional edges that can affect an accurate determination of a vessel boundary.

Figure 1A:
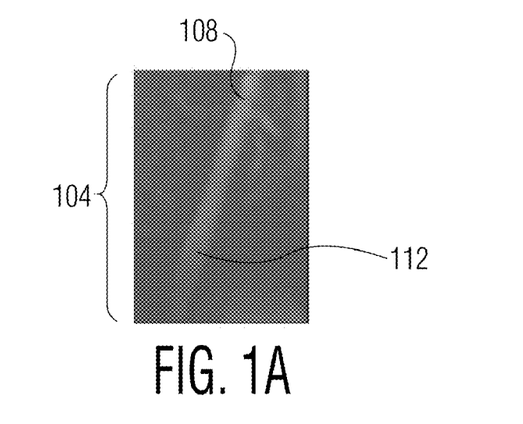
FIG. 1(a) shows a prior art three dimensional view of a vessel having different contrasts along the vessel.

FIG. 1A shows a three dimensional view of a vessel 104 having different contrasts along the vessel 104. Specifically, the top portion 108 of the vessel 104 is brighter than the bottom portion 112 of the vessel 104 because of the contrast agent taken by the patient. This change in contrast results in edges generated when an orthogonal (i.e., cross-sectional) view of the vessel 104 is used. These edges can result in inaccuracy when an algorithm is used to determine the boundaries of the vessel 104.

Figure 1B:
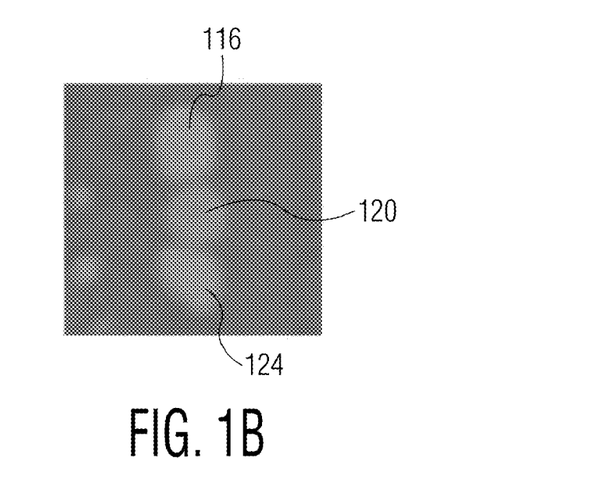
FIG. 1(b) shows a prior art orthogonal view of three vessels.
Figure 1C:
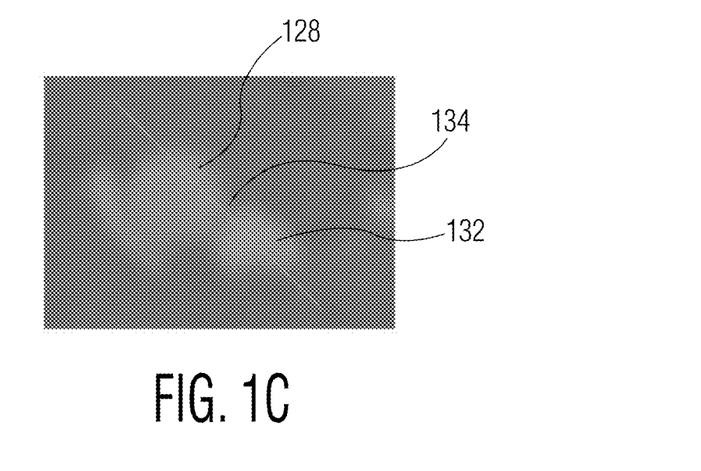
FIG. 1(c) shows a prior art orthogonal view of two vessels having diffused boundaries.

FIG. 1B shows an orthogonal view of three vessels 116, 120, 124. When the three vessels 116, 120, 124 are close together, one vessel's boundary is often difficult to distinguish from its neighboring vessel's boundary. FIG. 1C shows an orthogonal view of two vessels 128, 132. Each vessel's boundary is difficult to distinguish from the other's boundary because of the significant diffusion 134 of the boundaries.

There have been a variety of techniques that have been used to address the above mentioned challenges. For example, medical professional have estimated the boundary of a vessel using computer-aided drawing programs. This is an inaccurate process because the estimation of the boundary can vary widely from the actual boundary.

Another example is a "snake" model for segmenting vessel boundaries in the planes orthogonal to the vessel centerline. The "snake" model traditionally "inserts" a tube having a smaller diameter than the vessel into a representation of the vessel and then uses parameters to cause the tube to expand until reaching the vessel's walls. The selection of the parameters, however, are often initially estimated. An inaccurate selection of one or more parameters may result in the tube expanding beyond the actual vessel boundary. Thus, the snake model does not always provide accurate results.

Another attempt to address the above mentioned challenges is a ray propagation method. This method is based on the intensity gradients for the segmentation of vessels and detection of their centerline. However, the use of gradient strength by itself is often not enough for robust segmentation.

Another approach to solve the above-mentioned problem is based on explicit front propagation via normal vectors, which then combines smoothness constraints with mean-shift filtering. Specifically, the curve evolution equation $\partial C(s,t)/\partial t = S(x,y)\vec{N}$ was determined for the vessel boundaries where $C(s,t)$ is a contour, $S(x,y)$ is the speed of evolving contour and $\vec{N}$ is the vector normal to $C(s,t)$. In this approach, the contour $C(s,t)$ is sampled and the evolution of each sample is followed in time by rewriting the curve evolution equation in vector form. The speed of rays, $S(x,y)$ depends on the image information and shape priors. $S(x,y) = S_o(x,y) + \beta S_1(x,y)$ was proposed where $S_o(x,y)$ measures image discontinuities, $S_1(x,y)$ represents shape priors, and $\beta$ balances these two terms. Image discontinuities are detected via mean-shift analysis along the rays. Mean-shift analysis, which operates in the joint spatial-range domain where the space of the 2 dimensional lattice represents the spatial domain and the space of intensity values constitutes the range domain, is often used for robustly detecting object boundaries in images. This approach is often effective when vessel boundaries are well isolated. It is often difficult, however, to estimate parameters such as spatial, range kernel filter sizes, and/or the amount of smoothness constraints for the robust segmentation of vessels. In particular, the use of a single spatial scale and curvature based smoothness constraints are typically not enough for accurate results when vessels are not isolated very well.

Therefore, there remains a need to more accurately and robustly detect vessel boundaries.

BRIEF SUMMARY OF THE INVENTION

The present invention is a method and system for detecting a boundary of a vessel in an image. An accurate detection of a boundary requires an accurate detection of edges related to the vessel boundary while not recognizing edges associated with other structures unrelated to the vessel boundary. Edges are detected based on the change in intensity between data points over a plurality of distances. In one embodiment, edges are detected by propagating one or more rays along the vessel. A set of edges is then selected from the detected edges.

Further, incorrect edges can be eliminated from the edges. Each edge in the selected set of edges can be selected based on its strength.

An initial vessel boundary is then determined based on the selected set of edges. The vessel may be defined as a non-nested structure in order to determine the initial vessel boundary. A shape descriptor (e.g., one or more elliptical shape descriptors) is applied to the initial vessel boundary to determine a final vessel boundary.

These and other advantages of the invention will be apparent to those of ordinary skill in the art by reference to the following detailed description and the accompanying drawings.

DETAILED DESCRIPTION

Figure 2:
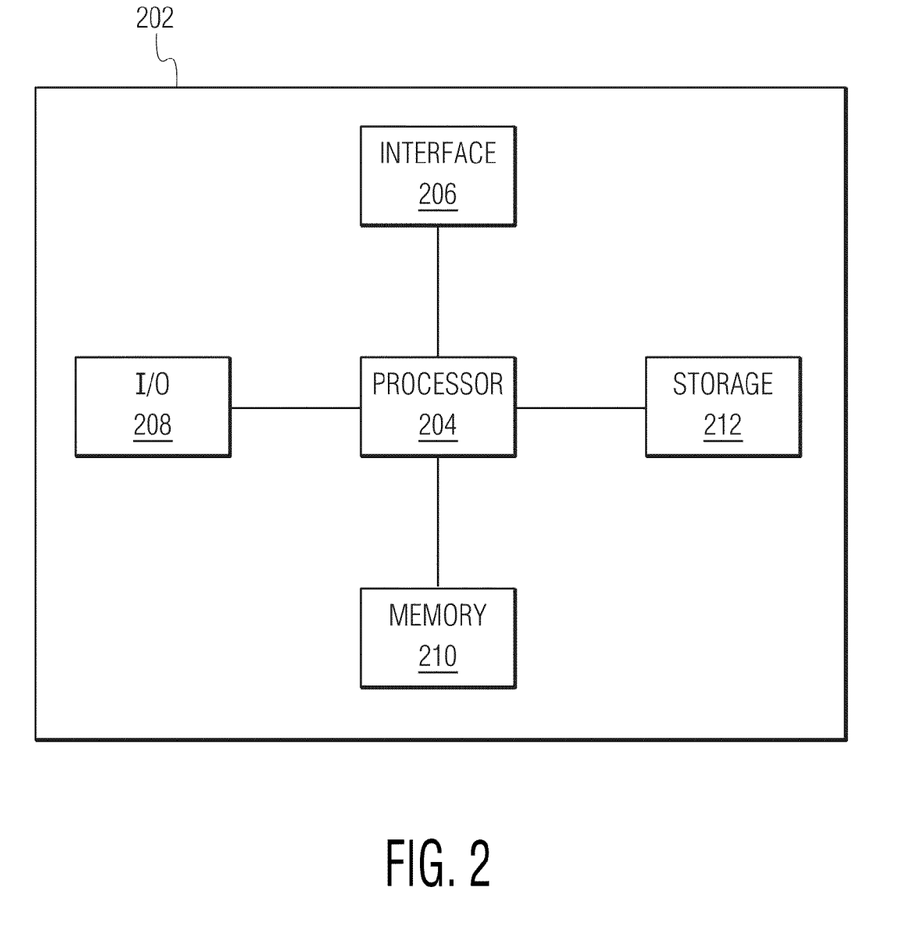
FIG. 2 is a high level block diagram of a computer in accordance with an embodiment of the invention.

The following description describes the present invention in terms of the processing steps required to implement an embodiment of the invention. These steps may be performed by an appropriately programmed computer, the configuration of which is well known in the art. An appropriate computer may be implemented, for example, using well known computer processors, memory units, storage devices, computer software, and other components. A high level block diagram of such a computer is shown in FIG. 2. Computer 202 contains a processor 204 which controls the overall operation of computer 202 by executing computer program instructions which define such operation. The computer program instructions may be stored in a storage device 212 (e.g., magnetic disk) and loaded into memory 210 when execution of the computer program instructions is desired. Computer 202 also includes one or more interfaces 206 for communicating with other devices (e.g., locally or via a network). Computer 202 also includes input/output 208 which represents devices which allow for user interaction with the computer 202 (e.g., display, keyboard, mouse, speakers, buttons, etc.). One skilled in the art will recognize that an implementation of an actual computer will contain other components as well, and that FIG. 2 is a high level representation of some of the components of such a computer for illustrative purposes. In addition, one skilled in the art will recognize that the processing steps described herein may also be implemented using dedicated hardware, the circuitry of which is configured specifically for implementing such processing steps. Alternatively, the processing steps may be implemented using various combinations of hardware and software. Also, the processing steps may take place in a computer or may be part of a larger machine (e.g., a medical imaging machine).

In accordance with the present invention, computer 202 uses displacement vectors of mean-shift analysis for detecting edges in multiple scales (i.e., over a plurality of distances). Specifically, a 1-dimensional intensity profile (ray) is obtained from a gray level image. Each pixel along the ray is characterized by a location x and an intensity value I. As a result, an input ray of N pixels is represented as a collection of 2-dimensional points $\{x_i, I_i\}$. The 2-dimensional space constructed as before is called the joint spatial-intensity domain. Then, mean shift filtering is applied to this joint domain. The output of the mean-shift filter includes a displacement vector $\{d_i\}$ which measures the spatial movement of each spatial point. In this algorithm, each point in this spatial-range domain is processed via the mean shift operator until convergence.

The robustness and accuracy of segmentation results often heavily depend on the selection of spatial ($\sigma_x$) and range ($\sigma_i$) scale parameters of mean-shift analysis because vessel boundaries are often in many spatial and range scales. The computer 202 executes a geometry-based algorithm that operates solely on the edges of intensity data for detecting vessel edges in multiple scales.

Figure 3A:
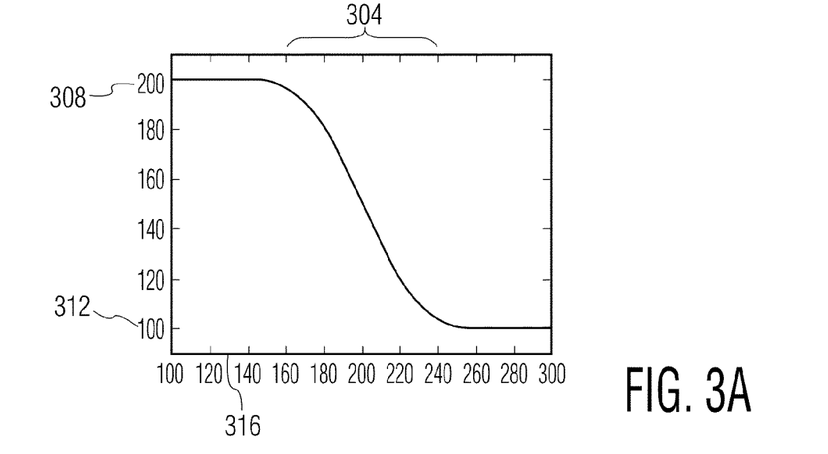
FIG. 3 shows graphical images of an intensity profile.
Figure 3B:
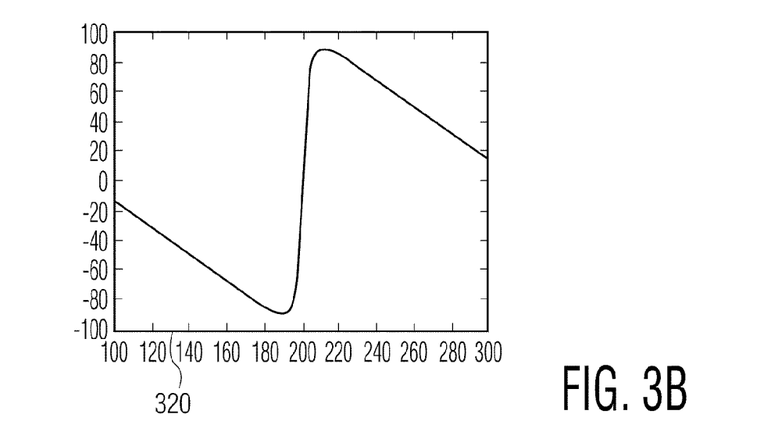
Figure 3C:
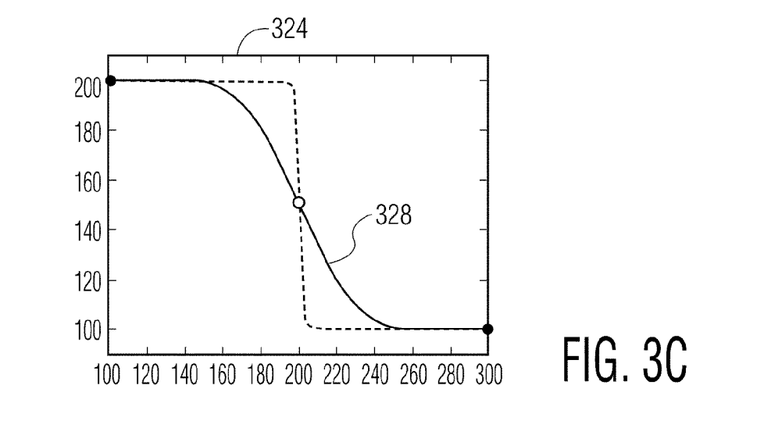

FIG. 3 shows a graphical representation of mean-shift filtering of a typical vessel edge. Diffuse edges, low contrast edges, and gap edges occur frequently, even in a single cross-sectional vessel boundary (e.g., as shown in FIG. 1 (c)). The computer 202 performs a boundary extraction method which combines the edges obtained from different spatial scales of mean-shift filtering along a ray.

Specifically, FIG. 3 shows a transition 304 of an edge from a high intensity area 308 (e.g., a bright area) to a low intensity area 312 (e.g., a dark area) in an intensity profile 316. The x-axis of FIG. 3 represents distance along an image (i.e., scale) and the y-axis of FIG. 3 represents intensities for the left and right plots and represents displacement values in the middle plot. The longer (i.e., the greater amount of distance of) the transition 304, the more image processing typically needed in order to detect the edge. In other words, the larger the scale (i.e., distance), the more image processing is needed in order to determine that the transition is an edge. There may also be multiple edges in multiple scales. For an accurate edge determination, the computer 202 detects edges in multiple scales.

There are typically two main difficulties with obtaining the correct edge from multi-scale edges. First, multiple erroneous edges are often present in the vicinity of the correct edge due to presence of noise in the intensity data. These edges do not typically correspond to semantically correct structures, e.g., a vessel boundary. As a result, these edges should be deleted. Second, there are often several edges along a ray corresponding to the structures of the boundaries. The edge corresponding to the boundary of a vessel can be determined from the geometric properties of the vessels and perceptual edge organization. In one embodiment, incorrect edges present along a ray can be removed based on edge confidence and edge strength.

Image 320 shows displacement vectors. The divergence of displacement vectors corresponds to the local mode of intensity, i.e., the clustering of intensity data. The intensity data can be locally clustered around the edge by mean-shift, if the proper scale, ($\sigma_x$), is chosen. The local clustering is used to define the edge confidence. The edge confidence measures the validity of an edge by checking the presence of local clustering. Specifically, the edge confidence for scale ($\sigma_{xk}$) at location/is given by:

$$E_{ci}(\sigma_{xk}) = \frac{\sum_{j=1}^{M} \frac{|I_j^* - I_i|}{|I_c - I_i|}}{M}$$

where M is the size of the filter, $I_j^*$ is a smoothed intensity at j, and $I_c$ corresponds to the intensity value of the convergence point, i.e., the local intensity mode. This measure is close to one if a local clustering forms around the edge and otherwise close to zero. In one embodiment, edges with small confidence (e.g., <0.4) are deleted. Edges having small confidence can form from applying small-scale mean-shift filtering on diffused edges.

In one embodiment, high confidence edges also form in the vicinity of a correct edge. To eliminate these incorrect edges, the edge strength of the edges are determined. The edge strength is the intensity difference between the intensity at the edge location and the convergence location. Convergence locations correspond to the spatial locations where the displacement vectors terminate after mean-shift filtering. Specifically, the edge strength of an edge location i is given by $E_s(i)=2|I_i-I_c|$, where $I_c$ is the intensity value of the convergence point. It should be noted that there are two convergence locations for each divergence location. In ideal conditions (i.e., well isolated step edges), the edge strength does not change based on selection of $I_c$. This assumption typically does not hold true and so the computer 202 selects the correct one.

Image 324 illustrates filtered intensity and original intensity together. The points representing the original intensity are line 328 (also shown in the left plot).

Figure 4A:
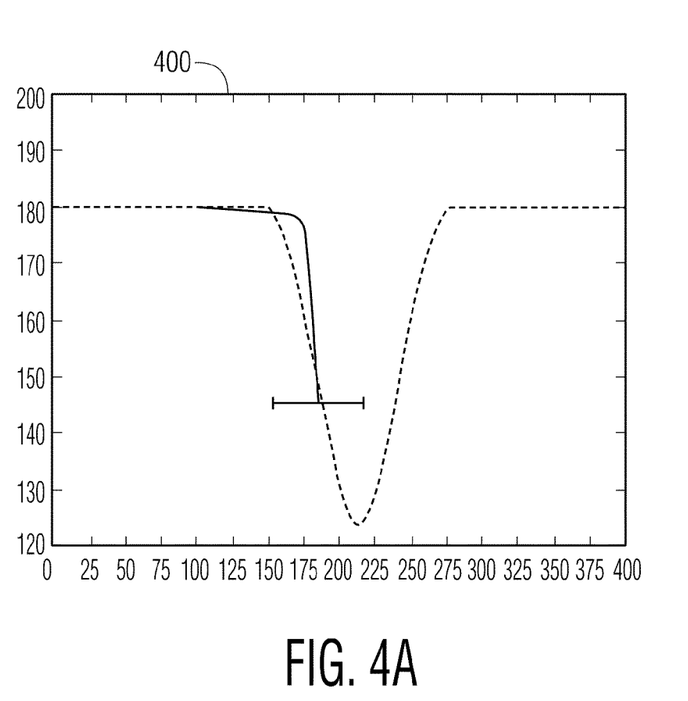
FIG. 4 shows a graphical representation of edge detection on a gap edge.
Figure 4B:
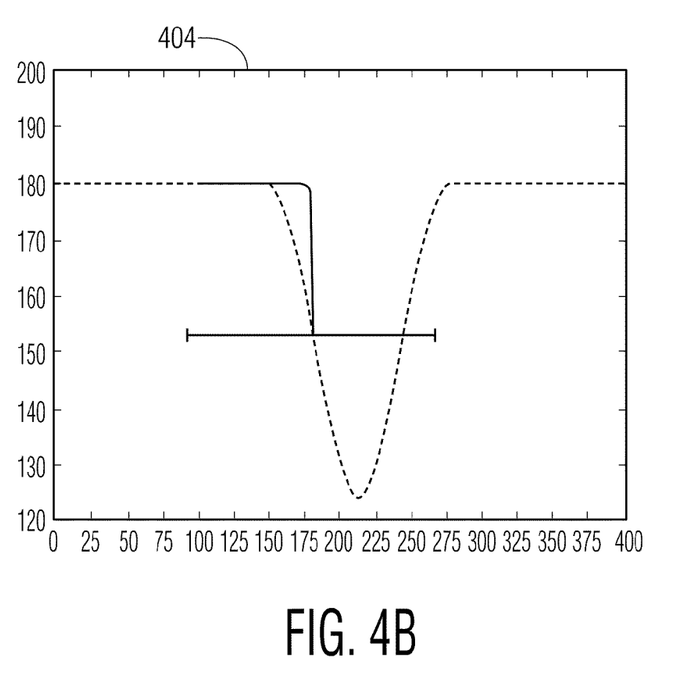

FIG. 4 shows a graphical representation 400 of mean-shift based edge detection on a gap edge (i.e., where the presence of nearby structures alters the intensity profile significantly). The detail analysis of mean-shift filtering points out that the edge location and the edge strength can be accurately computed from one side of the filter. In one embodiment, the edge strength is measured from the one side. The correct side is determined from the edge confidences of the sides. In particular and in one embodiment, the side that gives higher edge confidence is selected for the edge strength. An edge is then eliminated based on its strength and local mode. An edge is a correct edge if it is not located under the local mode of another edge. If it falls inside the local mode of another edge, it must have higher edge strength. The local mode of an edge corresponds to the interval between its convergence points.

When the correct size mean-shift is applied, the correct edge location is obtained (shown in image 404). Larger scale mean-shift moves the edge to the left and lowers the edge strength $E_s$.

Figure 5:
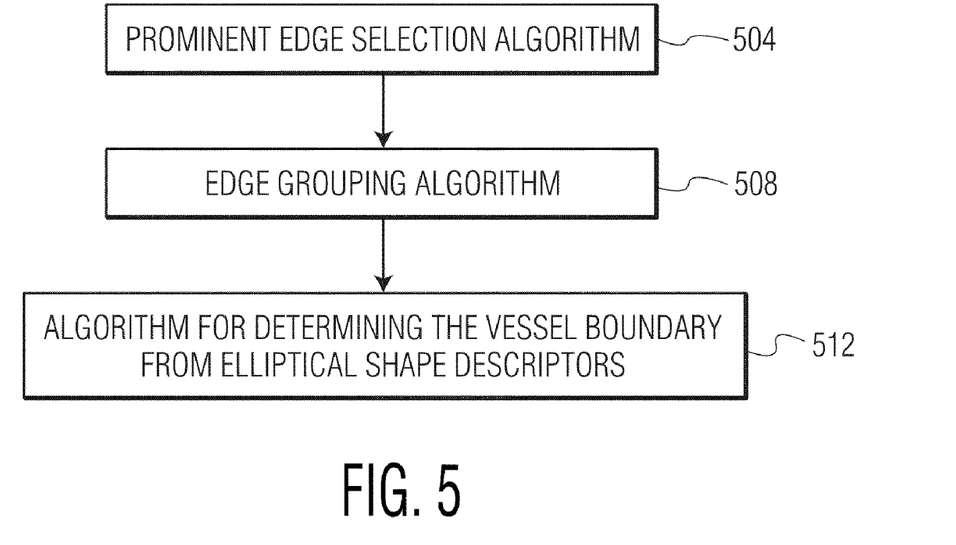
FIG. 5 shows a flowchart of the steps performed by the computer to detect vessel boundaries in accordance with an embodiment of the invention.

FIG. 5 shows a flowchart illustrating the algorithm for selecting edges corresponding to the cross-sectional boundary of vessels. A prominent edge selection algorithm 504, an edge grouping algorithm 508, and then an algorithm to determine the vessel boundary from elliptical shape descriptors 512 are implemented.

The prominent edge selection algorithm 504 assumes that vessels are not embedded inside other bright structures. The vessels are therefore locally surrounded by darker background. This assumption is referred to below as a "no nested structures" assumption. This assumption may not be valid if vessels are fully surrounded by darker appearing plaques. The prominent edges from multi-scale edges are determined by the "no nested structures assumption". Geometrically, the first significant edge (strength) encountered during a propagation along the rays from the seed point out often corresponds to the vessel boundary if there is no significant noise inside the vessels. Therefore, an edge is deleted from an edge map if there is a much more significant edge present on the right side (outward). Mathematically, the edge $E_i$ is deleted if $E_{si} < k_1 E_{sj}$ where $j \succ i \geq 0$ or if $k_1 E_{si} < E_{sj}$ where $i \succ j \geq 0$. $k_1$ is a parameter which specifies relative strength of edges. In one embodiment, the computer applies a range of $k_1$ values to select the prominent edges from multi-scales. For example, $k_1$ can be set to 0.1, 0.2, 0.3, 0.5, 0.7, and 0.9 and all of the prominent edges are marked in a single image.

Figure 6:
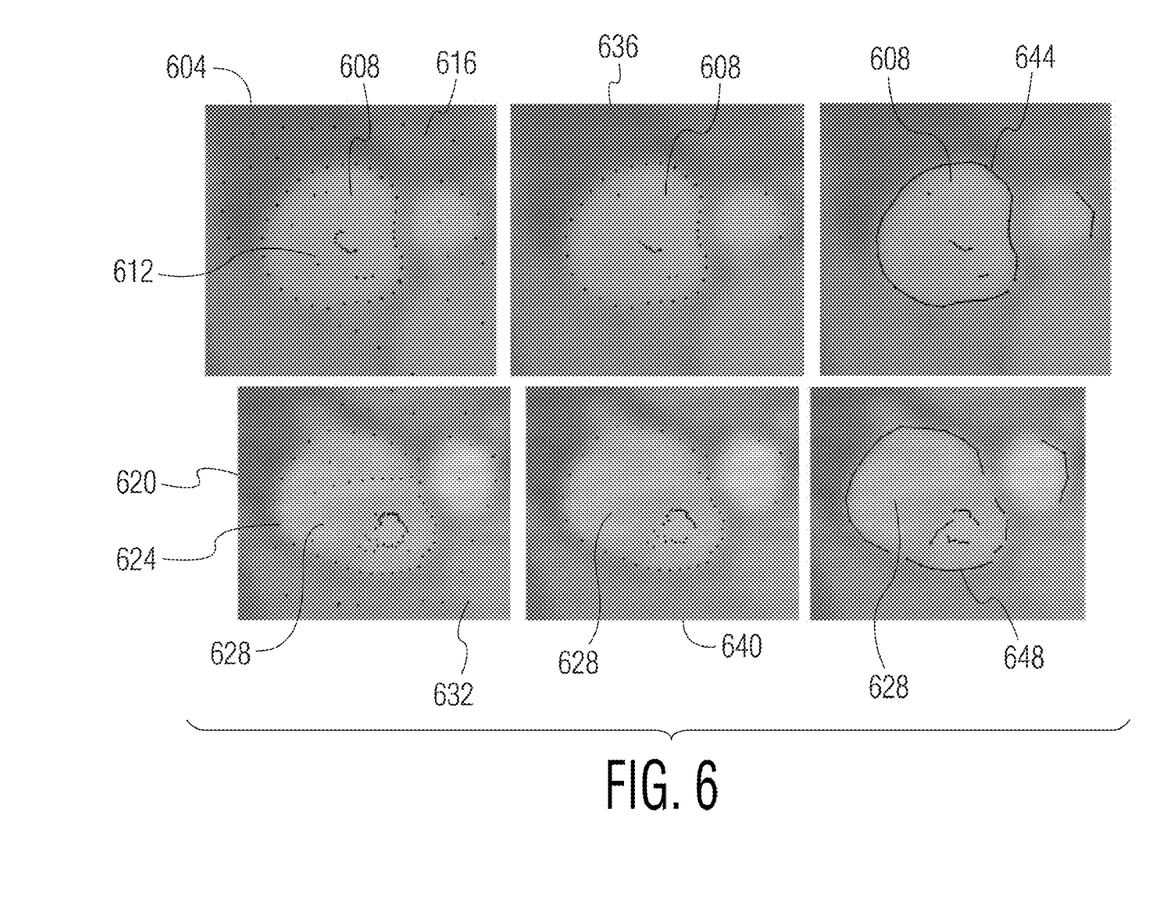
FIG. 6 shows images illustrating the steps used to detect vessel boundaries in accordance with an embodiment of the invention.

FIG. 6 shows multiple images including a vessel with marked edges. For example, image 604 includes vessel 608 that has edges such as edge 612. The image 604 also includes other edges not related to vessel 608, such as edge 616. Similarly, image 620 has edges such as edge 624 of vessel 628 and edge 632 unrelated to vessel 628. Using the algorithm described above, the prominent edges are selected while the other edges, such as edges 616 and 632, are removed. This prominent edge selection is shown in images 636 and 640. Most of the edges unrelated to the respective vessel 608, 628 have been removed.

The edge grouping algorithm 508 is then executed. The edge grouping algorithm 508 organizes edges into "long smooth curves," such as curves 644, 648.

Figure 7A:
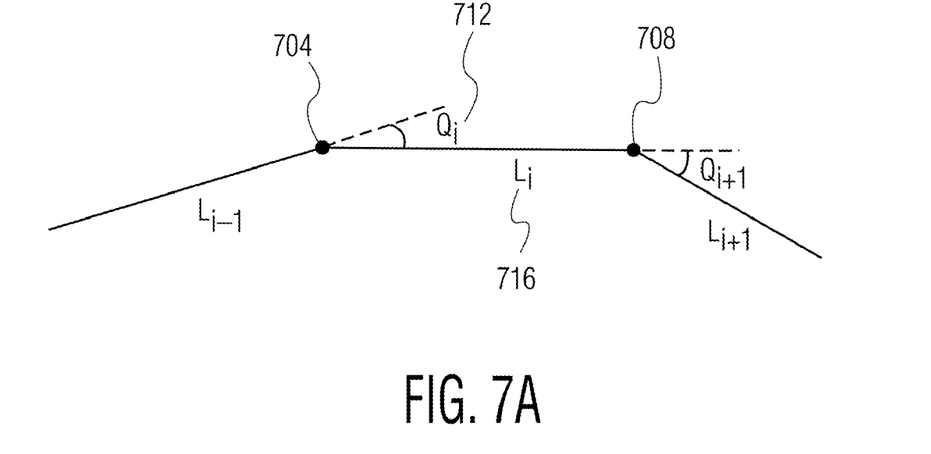
FIG. 7(a) shows a diagram of local grouping of edges in accordance with an embodiment of the invention.

FIG. 7(a) shows a diagram of local grouping of edges 704, 708. The edge grouping algorithm 508 exploits the angle $Q_i$ 712, and distance (length) $L_i$ 716 between edge elements (i.e., edges 704, 708). Specifically, edge grouping starts from three edge elements, which forms a smooth curve segment, i.e., small angle $Q_i$ 712. The curve then expands in two directions by adding more edge elements based on the neighboring angles. When multiple edge elements are "good" candidates for smoothness during the expansion of a curve segment, a branch point forms and new curve segments are initialized from this branch point. This iterative edge grouping terminates when all edge elements are considered for local grouping. This grouping algorithm converts edges to a set of curve segments $C=\{C_1, \ldots, C_N\}$.

After obtaining a set of smooth curve segments from prominent edges, one or more shape descriptors is applied. In one embodiment, elliptical shape descriptors are applied. The goal of this algorithm is to select a subset of k curve segments which correspond to the cross-sectional boundary of vessels. This can be accomplished by considering all geometrically possible subsets of curve segments and selecting a subset that is most similar to an ellipse. Geometrically possible curve segments correspond to the segments, which form smoother and longer curve segments when they are joined together without breaking them into pieces. Disjoint curve segments may form smooth curves, which then results in gaps between them. Gaps can occur when some parts of vessel boundary do not contain any edge due to the presence of nearby bright structures.

Figure 7B:
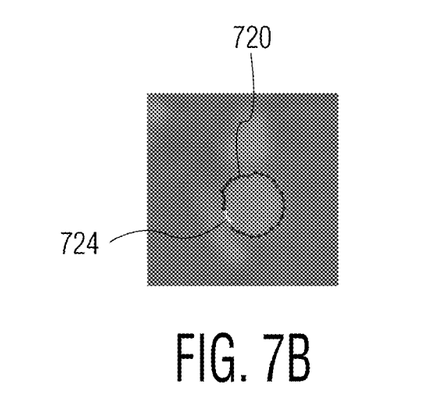
FIG. 7(b) shows a cubic spline being used to bridge gaps in a vessel boundary in accordance with an embodiment of the invention.

FIG. 7(b) shows a vessel boundary 720 having gaps. For example, when arteries touch veins in contrast enhanced MRA, there is no boundary between them. Thus, nearby vessels often remove some of the edges from vessel boundaries, thereby resulting in gaps. Similarly, in CTA, there may be no boundary between bone and a touching vessel due to intensity similarities. In addition, gaps can also form in the edge grouping stage due to the noise in the vessel boundaries.

To obtain a closed curve, the gaps are bridged by the best completion curves. These completion curves for gaps between curve segments or edge elements can be constructed from, for example, circular arcs. In another embodiment, cubic splines are used to bridge a gap. FIG. 7(b) shows a cubic spline 724 being used to bridge the gaps in the vessel boundary 720.

In one embodiment, the curve segments that best (i.e., most accurately) represent the cross-sectional boundary of a vessel is determined by an elliptical fit measure. In particular, while the global shape of a vessel boundary resembles an ellipse, the vessel boundary also may exhibit local variations from an ellipse due to the presence of nearby vessels. These local deformations should be preserved for an accurate boundary representation.

In one embodiment, elliptical Fourier descriptors are used to obtain the best curve from all of the possible ellipses. Fourier descriptors refer to the utilization of Fourier analysis, primarily the Fourier series, as a curve fitting technique that can numerically describe the shape of irregular structures.

Specifically, from given set C, an elliptical fit measure is computed for each geometrically possible subset of curve segments by elliptical Fourier descriptors. Among them, a subset of curve segments that best fits to an ellipse is selected as the boundary of vessels.

Figure 7C:
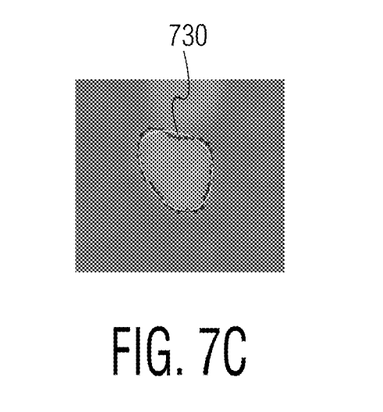
FIG. 7(c) shows a closed curve constructed from elliptical Fourier descriptors of a set of curve segments in accordance with an embodiment of the invention.
Figure 8A:
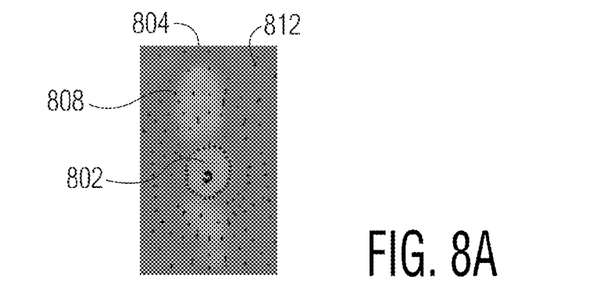
FIGS. 8(a)-(h) show images illustrating the steps used to detect vessel boundaries of a vessel in an initial image in accordance with an embodiment of the invention.
Figure 8B:
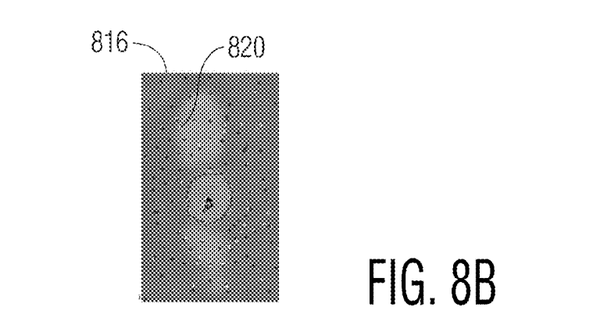
Figure 8C:
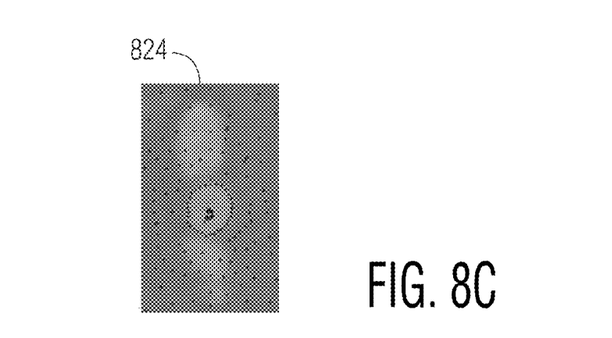
Figure 8D:
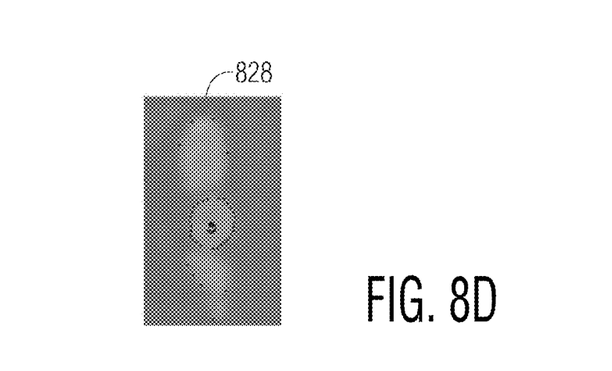
Figure 8E:
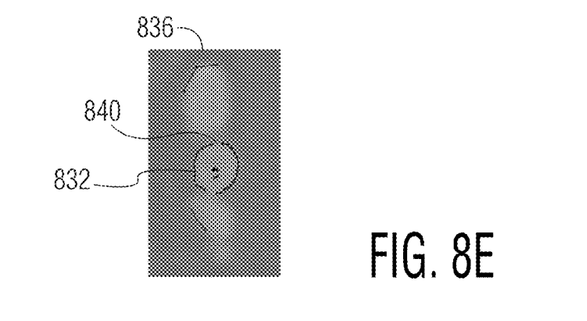
Figure 8F:
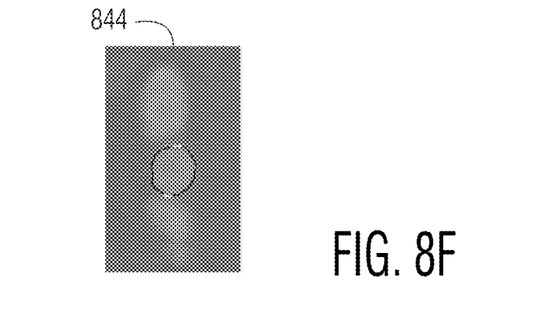
Figure 8G:
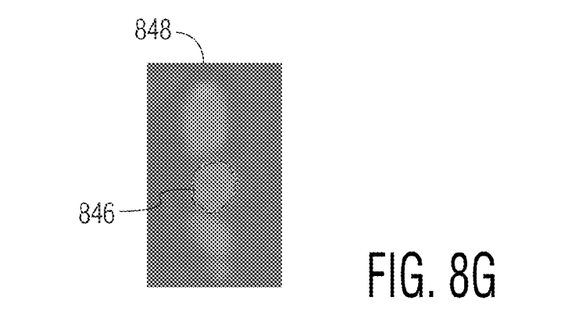
Figure 8H:
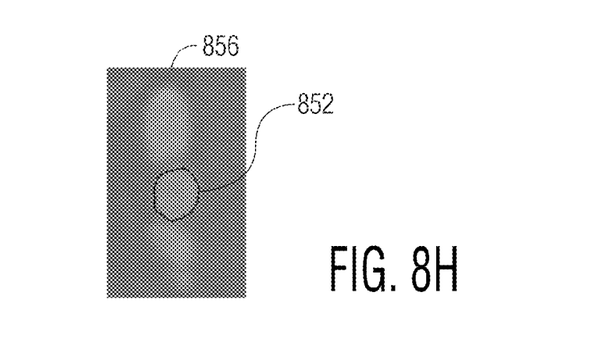

FIG. 7(c) shows a closed curve 730 constructed from the elliptical Fourier descriptors of a set of curve segments. In one embodiment, several Fourier coefficients were used because a low number of coefficients (e.g., less than 5) does not capture local deformations of boundary while a high number of coefficients (e.g., greater than 10) allows too much local deformation.

FIGS. 8(a)-(h) show the algorithms for detecting vessel boundaries being used on an initial image 804. All parameters associated with the algorithm remain constant throughout the algorithm processing. The initial image 804 is an orthogonal view of a vessel 802. The initial image 804 includes edges (e.g., edges 808 and 812). The computer 202 selects a seed point and then propagates rays from that seed point. Multi-scale edges are detected along the rays (e.g., 1 dimensional rays). Image 816 illustrates the next step in the algorithm—to eliminate incorrect edges (shown in white), such as incorrect edge 820. After the incorrect edges 820 are eliminated, image 824 is formed. Prominent edges are then selected in image 828 by setting $k_1$ to 0.1, 0.2, 0.3, 0.5, 0.7, and 0.9. Curve segments, such as curve segment 832, are then obtained in image 836 from the local edge grouping algorithm. These curve segments contain gaps, such as gap 840. The gaps are filled in using cubic spline (shown in white in image 844) between curve segments. The computer 202 then represents the curve set using Elliptical Fourier representation 846 (shown in white in image 848). The vessel boundary 852 is then obtained in image 856 from the elliptical fit.

The algorithm can also be used to construct a 3 dimensional vessel. In particular, the direction of the vessel is first determined. In one embodiment, the direction of the vessel is determined based on the eigenvalue analysis of Hessian matrix. Next, the algorithm is applied at a single seed point to determine a vessel boundary at that location. The seed point is then incrementally moved along the direction of the vessel and the algorithm is applied at each seed point, resulting in the obtaining of many vessel boundaries along the direction of the vessel. These boundaries can then be combined together to create a 3 dimensional representation of the vessel. Using this technique can enable accurate modeling of stenosis and aneurysms.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for detecting a boundary of a vessel in an angiography image comprising:
propagating at a processor a plurality of rays from a seed point within said boundary of said vessel of said angiography image;
detecting at the processor a plurality of multi-scale edges for each of said plurality of rays in said angiography image based on a change in intensity between data points over a plurality of distances of each of said plurality of rays, by combining edges obtained from different spatial scales of mean-shift filtering along each of said plurality of rays;
selecting at the processor a set of edges from said plurality of multi-scale edges using a prominent-edge selection algorithm;
determining at the processor an initial vessel boundary based on said selected set of edges; and
applying at the processor a shape descriptor to said initial vessel boundary to determine a final vessel boundary.

2. The method of claim 1 wherein said step of selecting a set of edges further comprises selecting said set of edges based on their strengths.

3. The method of claim 2 further comprising the step of determining a strength for each edge in said plurality of edges.

4. The method of claim 1 further comprising the step of eliminating incorrect edges from said plurality of edges.

5. The method of claim 1 further comprising the step of deleting incorrect edges in said initial vessel boundary.

6. The method of claim 1 wherein said step of determining an initial vessel boundary further comprises the step of defining said vessel as a non-nested structure.

7. The method of claim 1 wherein said step of applying further comprises the step of applying an elliptical shape descriptor to said initial vessel boundary.

8. The method of claim 1 wherein said step of detecting a plurality of edges further comprises propagating at least one ray along said vessel.

9. An apparatus for detecting a boundary of a vessel in an image comprising:
means for propagating a plurality of rays from a seed point within said boundary of said vessel of said image;
means for detecting a plurality of multi-scale edges for each of said plurality of rays in said image based on a change in intensity between data points over a plurality of distances of each of said plurality of rays, by combining edges obtained from different spatial scales of mean-shift filtering along each of said plurality of rays;

means for selecting a set of multi-scale edges from said plurality of edges using a prominent-edge selection algorithm;

means for determining an initial vessel boundary based on said selected set of edges; and means for applying a shape descriptor to said initial vessel boundary to determine a final vessel boundary.

10. The apparatus of claim 9 wherein said means for selecting said set of edges further comprises means for selecting said set of edges based on a strength associated with each edge in said plurality of edges.

11. The apparatus of claim 10 comprising means for determining a strength for each edge in said plurality of edges.

12. The apparatus of claim 9 comprising means for eliminating incorrect edges from said plurality of edges.

13. The apparatus of claim 9 comprising means for deleting incorrect edges in said initial vessel boundary.

14. The apparatus of claim 9 wherein said means for determining said initial vessel boundary further comprises means for defining said vessel as a non-nested structure.

15. The apparatus of claim 9 wherein said means for applying further comprises means for applying an elliptical shape descriptor to said initial vessel boundary.

16. The apparatus of claim 9 wherein said means for detecting said plurality of edges further comprises means for propagating at least one ray along said vessel.

17. A computer readable medium comprising computer program instructions capable of being executed in a processor and defining the steps comprising:

propagating a plurality of rays from a seed point within a boundary of a vessel of an image;

detecting a plurality of multi-scale edges for each of said plurality of rays in said image based on a change in intensity between data points over a plurality of distances of each of said plurality of rays;

selecting a set of edges from said plurality of multi-scale edges using a prominent-edge selection algorithm, by combining edges obtained from different spatial scales of mean-shift filtering along each of said plurality of rays;

determining an initial vessel boundary based on said selected set of edges; and applying a shape descriptor to said initial vessel boundary to determine a final vessel boundary.

18. The computer readable medium of claim 17 wherein said step of selecting a set of edges further comprises selecting said set of edges based on their strengths.

19. The computer readable medium of claim 18 further comprising computer program instructions defining the step of determining a strength for each edge in said plurality of edges.

20. The computer readable medium of claim 17 further comprising computer program instructions defining the step of eliminating incorrect edges from said plurality of edges.

21. The computer readable medium of claim 17 further comprising computer program instructions defining the step of deleting incorrect edges in said initial vessel boundary.

22. The computer readable medium of claim 17 wherein said step of determining an initial vessel boundary further comprises the step of defining said vessel as a non-nested structure.

23. The computer readable medium of claim 17 wherein said step of applying further comprises the step of applying an elliptical shape descriptor to said initial vessel boundary.

24. The computer readable medium of claim 17 wherein said step of detecting a plurality of edges further comprises the step of propagating at least one ray along said vessel.

* * * * *